United States Patent [19]
Erlichman

[11] 3,748,990
[45] July 31, 1973

[54] PHOTOGRAPHIC APPARATUS
[75] Inventor: Irving Erlichman, Wayland, Mass.
[73] Assignee: Polaroid Corporation, Cambridge, Mass.
[22] Filed: Sept. 17, 1971
[21] Appl. No.: 181,408

Related U.S. Application Data
[63] Continuation-in-part of Ser. No. 178, Jan. 2, 1970, abandoned.

[52] U.S. Cl. .................................. 95/30, 95/13
[51] Int. Cl. ................................. G03b 19/10
[58] Field of Search .............. 95/13, 14, 19, 22, 95/30, 66

[56] References Cited
UNITED STATES PATENTS
641,268   1/1900   Chase .................................. 95/30
1,823,321  9/1931  Hammond ............................. 95/30
625,379   5/1899   Carns ................................... 95/30
662,696   11/1900  Pratt et al. ............................ 95/30
1,066,955  7/1913  Schmuch .............................. 95/30
1,469,273  10/1923 Kauser ................................. 95/30
2,463,878  3/1949  Johnson ............................... 95/30

Primary Examiner—Samuel S. Matthews
Assistant Examiner—Richard M. Sheer
Attorney—John S. Vale, Stanley H. Mervis et al.

[57] ABSTRACT

A photographic apparatus is provided with a variable geometry lighttight chamber which is adapted to expand, as it is extended from a housing to receive a film unit being advanced therefrom, and to contract as it is retracted into the housing to transport the film unit to a storage position within the housing.

16 Claims, 6 Drawing Figures

PATENTED JUL 31 1973

INVENTOR.
IRVING ERLICHMAN

BY Brown and Mikulka
and
John S. Vale
ATTORNEYS

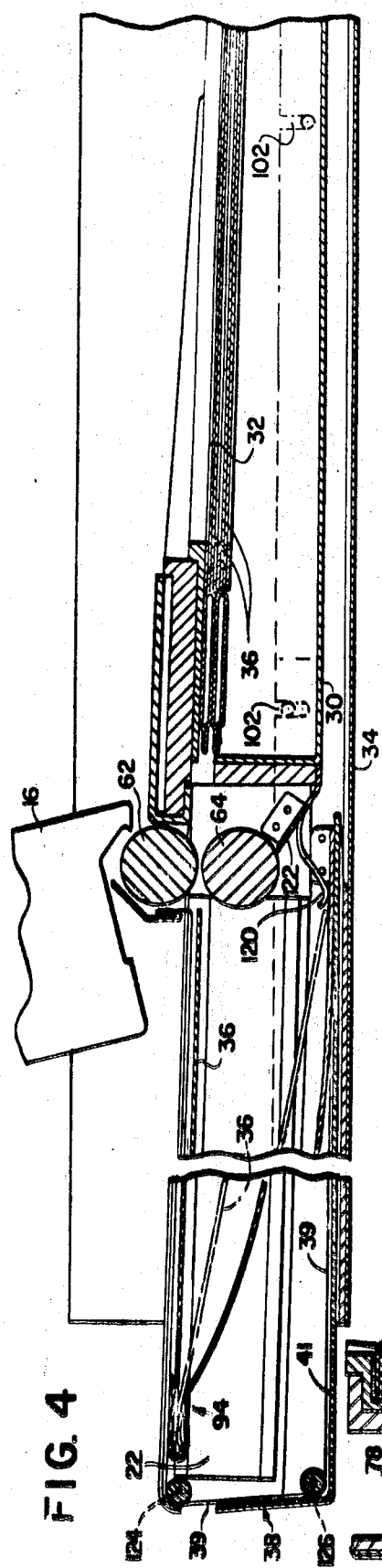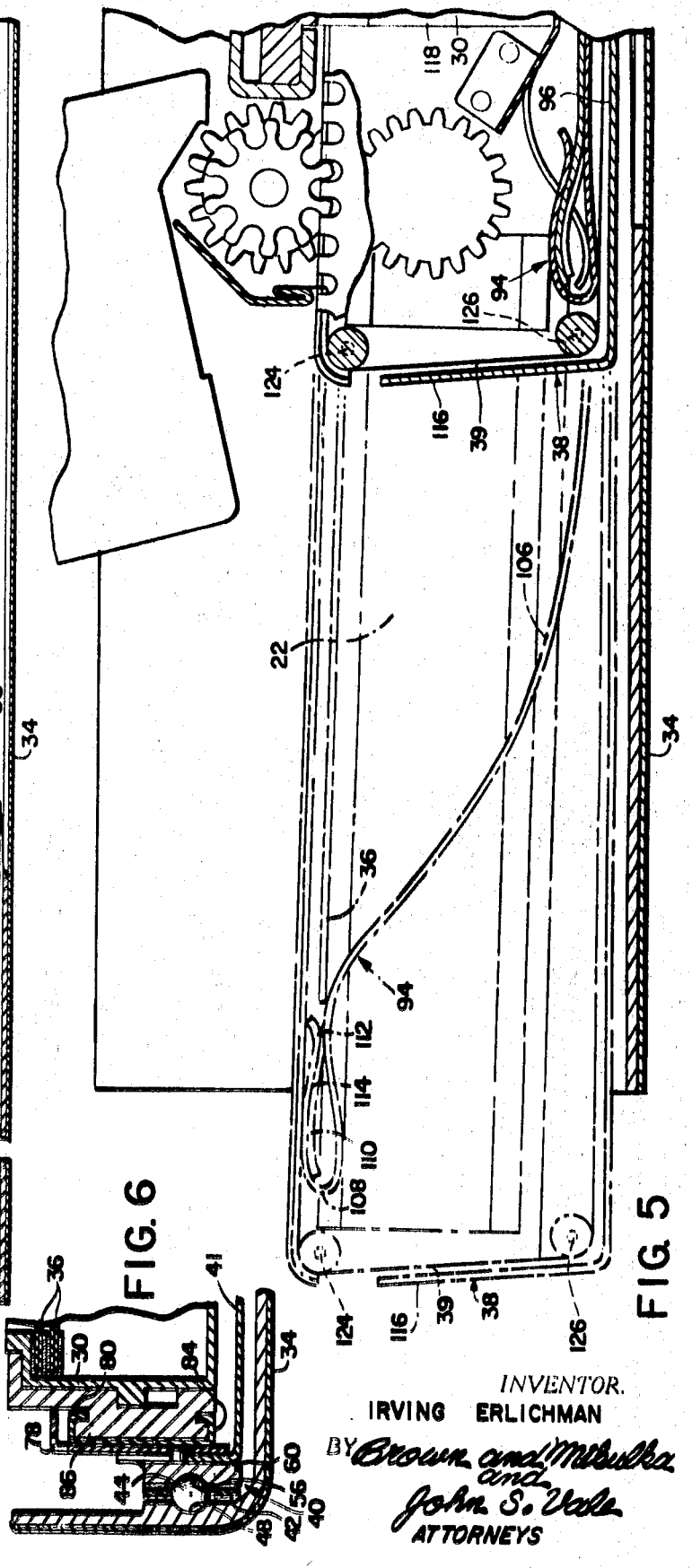

PHOTOGRAPHIC APPARATUS

CROSS-REFERENCE TO RELATED APPLICATIONS

This is a continuation-in-part of my copending application Ser. No. 178, filed Jan. 2, 1970, now abandoned.

BACKGROUND OF THE INVENTION

Field of the Invention

This invention relates to improvements in photographic apparatus and, more particularly, to an expandable, lighttight chamber that permits movement of an exposed photosensitive element from an exposure position to a storage position within the photographic apparatus without deforming the element during transit.

Photographic apparatus of the type with which the present invention is concerned is a self-developing camera as described and shown in my copending applications Ser. No. 763,883, filed Sept. 30, 1968, now U.S. Pat. No. 3,589,253, Ser. No. 880,794, filed Dec. 28, 1969, now U.S. Pat. No. 3,702,580, and Ser. No. 179, filed Jan. 2, 1970, now U.S. Pat. No. 3,653,308. As disclosed in the last two mentioned copending applications, the camera includes a housing having means therein for supporting a film unit at an exposure plane. After exposure the film unit is advanced through a processing station toward the exterior of the housing. A reciprocally driven lighttight chamber, coupled to the housing, is adapted to be extended therefrom, in the path of travel of the film unit, for receiving the film unit. Thereafter, the chamber is adapted to be retracted into the housing for transporting the film unit to a storage position within the camera. The general nature of the film unit utilized with the above-mentioned camera is more completely described in Ser. No. 5,799, filed Jan. 26, 1970, now U.S. Pat. No. 3,619,192 as a continuation-in-part of Ser. No. 622,285, filed Mar. 10, 1967, now U.S. Pat. No. 3,479,814 in the name of Edwin H. Land et al. and and assigned to the same assignee as the present invention. The film unit above described is a self-developing type utilizing a diffusion transfer process more completely described in U.S. Pat. No. 3,415,644, issued Dec. 10, 1968, in the name of Edwin H. Land and assigned to the same assignee as the present invention.

The film unit previously mentioned has a format wherein a photosensitive element is exposed through a transparent element held in face-to-face relationship therewith. A container of processing composition is disposed at one end thereof prior to exposure and, after exposure, is distributed in contact with the photosensitive element to initiate the development of a visible image by the diffusion transfer process. The film unit utilized is one in which the basic film structure existing prior to exposure is maintained in the developed photograph so that the original components are all utilized in the finished product. That is to say, the processing composition is driven from the container and dispensed between the transparent element and the photosensitive element to develop a visible image which, when developed, is protected by the transparent element. The container that is ruptured to distribute the processing composition remains fixed to the resulting relatively flat laminate, and therefore, no parts of the film unit as constructed prior to development are removed after the visible image is formed.

The above-described film format is desirably relatively rigid in construction because the developed film unit is not later supported by any means. In addition, the developed film unit is preferably flat when developed so that all areas of the laminate are coplanar with respect to all other parts. This flatness is important both from the standpoint of ease of movement to storage in the photographic apparatus and also for ease of storage in the minimum volume available in the apparatus. This rigidity, or stiffness, is natural to the film unit herein used in that the transparent portion has a certain modicum of inherent rigidity, and the photosensitive element that is later laminated thereto increases the inherent rigidity of the transparent element.

A certain amount of time must necessarily pass after the photosensitive element is exposed, during which time development takes place and the resultant laminate is formed. The processing composition is distributed across the photosensitive element almost immediately after exposure by being passed between pressure-applying members, such as processing rollers. After the processing composition is distributed, it is desirable that further pressure sufficient to disturb the distribution of processing composition not be applied to any part of the film unit. In other words, if the film unit with the newly distributed processing composition is distorted immediately after the processing composition is distributed, the resultant visible image could be deleteriously affected. Accordingly, it is desirable that the exposed photosensitive element be immediately moved from the exposure position to permit the immediate exposing of another film unit while handling the previously exposed film unit in a manner that will not adversely affect its photographic quality.

It is essential in the handling of certain types of exposed film units developed by the diffusion transfer process that the exposed photosensitive element be maintained in a lighttight environment for at least some period of time after exposure. It is also desirable that means be provided for storing exposed film units automatically so that the operator of the photographic apparatus can immediately expose other film units. Therefore, in a camera of the type previously described, having as small an overall size as possible, it is proposed to utilize a film format of the type described utilizing the diffusion transfer process to develop a visible image, and to provide storage apparatus for developed film units while handling exposed film units. All of the foregoing is to be accomplished while the exposed film unit is moving to a position of storage in a manner precluding distortion of the film unit.

The camera is designed to accept a film container housing a plurality of film units arranged in stacked relation therein. By virtue of the fact that each film unit has a processing fluid pod at one end, the container is thicker at one end than the other, or in other words, is wedge-shaped in longitudinal cross section. The container is inserted into the camera housing in overlying relation to a planar bottom wall of the housing with the photosensitive surface of the forwardmost film unit facing an exposure plane located above the bottom wall. The exposure plane is preferably disposed at an inclined angle relative to the bottom wall of the housing to accommodate the wedge-shaped film container.

In order to maintain the film unit in a stress-free condition, it is desirable to advance the film unit through the processing rollers and toward exterior of the housing along a linear path which is substantially parallel to the inclined exposure plane. This causes the film unit to progressively diverge from the bottom wall of the camera. Thus, the reciprocally driven lighttight chamber must be sufficiently large to enclose the inclined path of travel of the film unit without having the film unit coming into contact with the chamber walls. Since the chamber is configured to be retracted into the housing for storage, it is also desirable to minimize the size of the chamber to reduce the overall dimensions of the camera.

SUMMARY OF THE INVENTION

The present invention is addressed to the problem of providing a camera, of the type having an exposure plane inclined at an angle with respect to the bottom wall of the camera housing, with a lighttight chamber which is large enough to enclose the inclined path of travel of the film unit as it is moved toward the exterior of the camera but yet is small enough to be stored within a compact camera housing.

The problem is solved by providing the camera with a variable geometry chamber which is configured to progressively expand as it is extended from the camera housing to receive a film unit advancing along the inclined exposure plane. The chamber is also adapted to progressively contract as it is retracted into the housing to facilitate storage of the chamber within the housing.

This is accomplished by providing the chamber with expandable side walls. As will be described in detail hereinafter, the side walls are formed by two cooperating members, one of which is movable along a plane substantially parallel to the bottom wall of the housing. The other member is movable in a plane substantially parallel to the inclined exposure plane. The members are also movably coupled to one another such that they may diverge as the chamber is extended and converge as the chamber is retracted.

One of the side wall members is also coupled to means for advancing the film unit toward the exterior of the camera and serves to drive the chamber between its extended and retracted positions. More specifically, a relatively flat film unit includes a photosensitive element that is supported and exposed on an exposure plane and then is moved to a position where it is subjected to a certain modicum of pressure so that a processing composition is very precisely distributed across the exposed photosensitive element. Then the exposed film unit is moved into an expandable, lighttight chamber which permits movement of the exposed film unit from this position in essentially a straight line path. When the exposed film unit is moved sufficiently to clear the means provided for distributing the processing composition, the path of movement of the film unit is altered so that it is adapted to move on a plane angularly disposed with respect to the exposure plane. The point at which the path of movement of the film unit is altered corresponds to one extreme of movement of the expandable, lighttight chamber where the chamber assumes its maximum size. At this juncture the lighttight chamber commences a reduction in size which is accompanied by a redirection of the film unit (to a storage position within the photographic apparatus) on a plane that is angularly disposed with respect to the exposure plane. The lighttight chamber therefore serves a dual function, namely, to provide a lighttight environment for the exposed film unit while an image is being developed by the diffusion transfer process, and to move the exposed film unit to a storage position. Therefore, this chamber will hereinafter be termed a processing chamber.

DESCRIPTION OF THE PRIOR ART

The prior art discloses two patents; U.S. Pat. No. 2,873,658, issued Feb. 17, 1959; and U.S. Pat. No. 2,467,320, issued Apr. 12, 1949 to E. H. Land, both of which feature a self developing camera including a lighttight chamber into which a film unit is advanced after processing. Both of these chambers are adapted to form extensions of the camera housing in which the exposure plane and supply of film units are located. Neither camera is operative to transport the film unit into the housing for storage and the addition of the chamber substantially increases the overall dimensions of the camera.

The lighttight chamber disclosed in U.S. Pat. No. 2,467,320 has expandable side walls but is not adapted to be stored within the camera housing but rather in overlying relation to the housing, again adding bulk to the camera. When the chamber is located in its stored position, the camera is inoperative since it is stored in the field of view of the camera's optical system.

U.S. Pat. No. 641,268, issued on Jan. 16, 1900, to J. J. Chase discloses a camera having a drawer type of lighttight chamber for receiving an exposed film unit and transporting the film unit to a storage position within the camera housing.

However, the Chase camera is designed to accept flat glass photosensitive plates that may be easily stacked in parallel relation over the bottom wall of the housing for sequential presentation at an exposure plane disposed in parallel relation to the bottom wall. Chase does not contend with a film unit having a relatively thick container of processing fluid at one end. He does not employ an exposure plane which is inclined with respect to the bottom wall of the camera and therefore does not disclose a processing chamber capable of being expanded to enclose an inclined path of travel, nor would it be obvious from his teachings to conceive of and construct such an expandable chamber.

OBJECTS OF THE INVENTION

Accordingly, it is an object of the present invention to provide an improvement in photographic apparatus that allows an exposed photosensitive element to be moved from an exposure position to another position within the photographic apparatus while precluding distortion of the exposed photosensitive element during that movement.

It is another object of the present invention to provide an improvement in photographic apparatus wherein an exposed photosensitive element is moved from the exposure plane on a path substantially parallel to the exposure plane and is then pivoted to another plane angularly disposed with respect to the exposure plane and moved to a storage position.

It is still another object of the present invention to provide an improvement in photographic apparatus wherein an exposed photosensitive element is moved from an exposure plane through pressure-applying members to distribute a processing composition thereacross which includes drive means for allowing movement of the exposed photosensitive element in a path substantially parallel to the exposure plane and also including support means moving in a path defined by a plane on which the exposed photosensitive element is to be stored.

It is a further object of the present invention to provide an improvement in photographic apparatus wherein a reciprocable, expandable, lighttight chamber provides the advantages set forth by the previous objects and is driven by means within the photographic apparatus for distributing processing composition across the exposed photosensitive element and wherein the normal fixed volume of the photographic apparatus is only temporarily increased by the inclusion of the expandable lighttight chamber.

It is yet another object of the present invention to provide a photographic apparatus including a housing having a bottom wall, an exposure plane disposed at an inclined angle relative to the bottom wall, means for advancing an exposed film unit along a plane substantially parallel to the inclined exposure plane toward the exterior of the housing; means defining an expandable lighttight chamber, and means coupling the chamber to the housing such that the chamber progressively expands as it is extended from the housing and progressively contracts as it is retracted into the housing.

Other objects of the invention will, in part, be obvious and will, in part, appear hereinafter.

The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings.

DESCRIPTION OF THE DRAWINGS

FIG. 4 is a sectional view of the camera of the subject invention, the processing chamber shown in the fully extended position;

FIG. 5 is an enlarged view of a portion of FIG. 4 with the film angle-changing means shown by dotted lines in the configuration it assumes when the processing chamber is fully extended and by solid lines in the configuration it assumes with the processing chamber fully retracted; and FIG. 6 is a partial sectional view of the support and drive structure for the processing chamber.

DETAILED DESCRIPTION OF THE INVENTION

Figure 1:
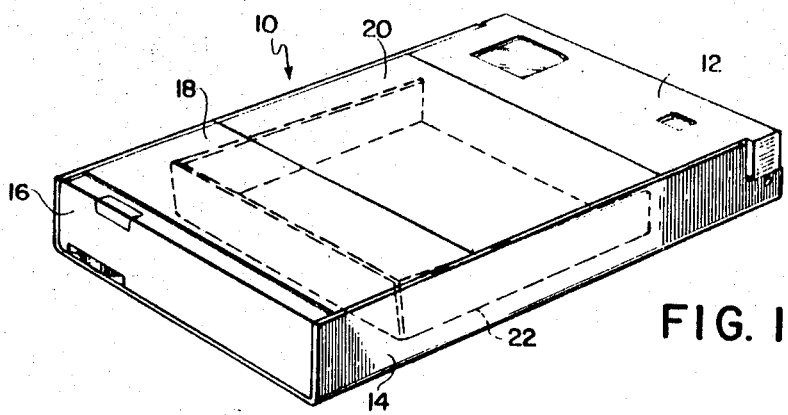
FIG. 1 is a perspective view of the camera of the present invention shown in its folded or inoperative position with the position of a processing chamber shown in dotted lines.

Referring to FIG. 1, camera 10 is the self-developing type and is shown in the nonerected or inoperative position. Camera 10 generally includes a rangefinder-viewfinder housing 12, main body housing 14, lens and shutter control housing 16, and bellows cover plates 18 and 20. An expandable drawer-type, translationally reciprocable, processing chamber 22 is shown in dotted lines in FIG. 1. Chamber 22 is shown partially extended in FIG. 2. Chamber 22 is formed by a drawer-type member 38, elongated members 72 and 74, and a covering curtain 39 (See FIG. 3). The rearward portion of drawer 38 is open but is in the lighttight environment of camera 10. Therefore, chamber 22 is an extension of the lighttight interior of camera 10.

Figure 2:
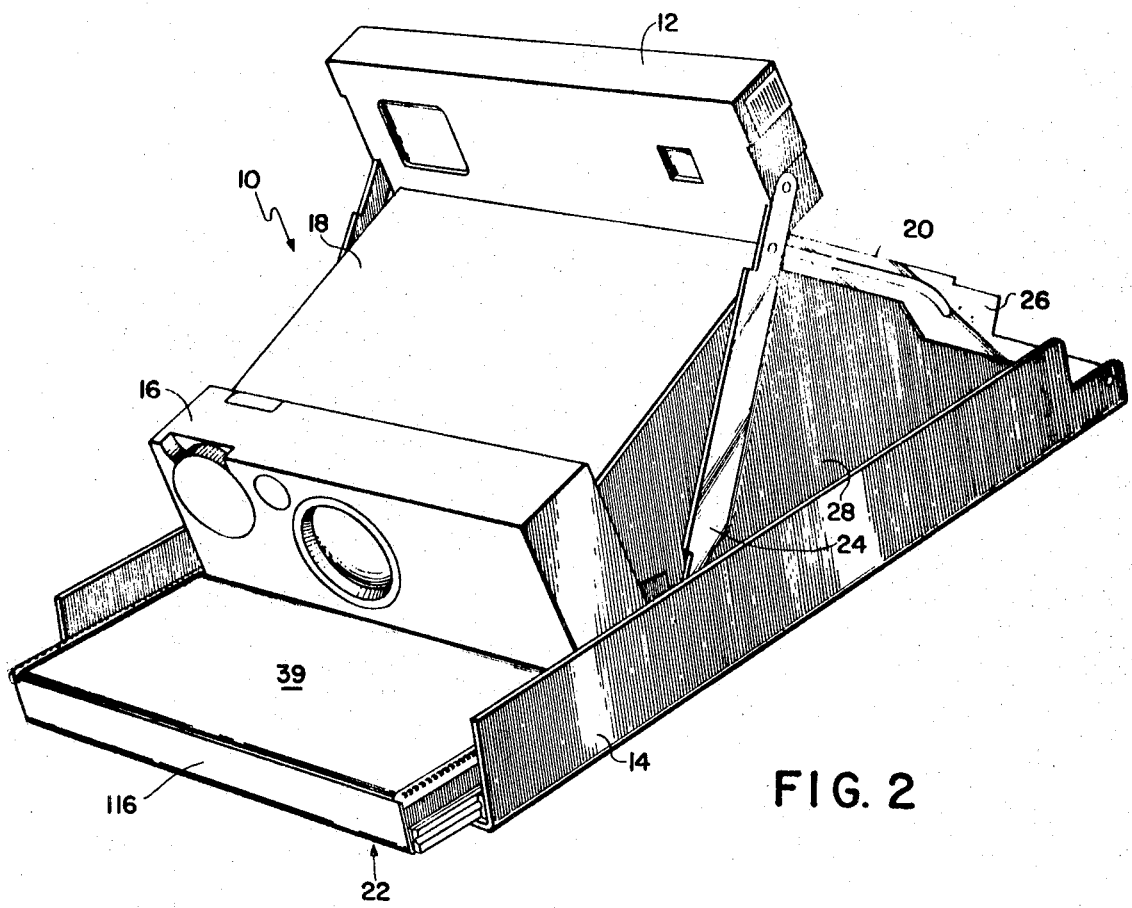
FIG. 2 is a perspective view of the camera of FIG. 1 shown in its erected or operative position with the processing chamber shown partially extended from the camera body.

Referring to FIG. 2, camera 10 is shown in an erected configuration which is the operative form of the camera. A pair of erecting links 24 and a pair 26, only one shown, very precisely locate the rangefinder-viewfinder housing 12 with respect to the lens and shutter control housing 16. Bellows 28 maintains the exposure area of the camera of the subject invention lighttight as later described. A more detailed description of the camera of the type in which the present invention is useful is found in Ser. No. 763,883, now U.S. Pat. No. 3,589,253, as previously noted. The operation of the camera will be detailed herein only to the extent necessary to describe the present invention.

Referring to FIG. 4, the uppermost film unit in wedge-shaped container 30 is situated on exposure plane 32. Exposure plane 32 is surrounded by bellows 28 on one side and by a film unit on another side and, therefore, the exposure area is lighttight. Container 30 is positioned against the exposure plane in lighttight relationship therewith. Rear wall 34 of housing section 14 is adapted to pivot downwardly to provide access for loading container 30 as more completely described in my copending application Ser. No. 179, now U.S. Pat. No. 3,653,308. It is noted in FIG. 4 that the exposure plane 32 is disposed at an inclined angle with respect to bottom wall 34 of camera main body 14. The bottom wall of container 30 is angled with respect to the exposure plane but parallel with respect to wall 34. It should also be noted that descriptions herein, such as bottom, top, rear, and front, refer to an orientation of camera 10 when it is in the operative position. That is to say, the front of camera 10 is the portion facing a scene to be photographed. However, it should be understood that the camera of the subject invention is operative if the orientation of the scene or of camera parts relative to the ground changes.

Inclined exposure plane 32 is the plane on which the scene to be photographed is projected so that when the appropriate shutter mechanism is operated, the scene is recorded on a surface of a photosensitive element contained in film unit 36. It is understood that all of the film units carried in container 30 are identical and may be of the type set forth in Ser. No. 5,799, now U.S. Pat. No. 3,619,192, previously mentioned. It should be made clear that other film formats can be utilized in the operative environment of the present invention and that descriptions of the operation of the particular type film unit set forth in the previously mentioned application merely typifies the type of film unit with which the present invention is operative and useful.

Film unit 36 is of a very simple construction and generally comprises a photosensitive element held in face-to-face relationship with a transparent element, both elements being bound peripherally to form a unitary structure. At one end of the film unit, adjacent the face-to-face elements, is a container of liquid processing composition which is distributed across and in contact with an exposed photosensitive element by the pressure-applying members of the subject camera to initiate a diffusion transfer process that develops a visible image of the scene photographed. Further details and description of the film unit of the present invention are available in the previously mentioned application. However, it is obvious that the processing composition must be spread or distributed across the photosensitive element very precisely in order to maintain a high quality in the developed picture. Therefore, it is important that provision be made in the camera previously described for handling and storage of an exposed photosensitive element having the processing composition already spread thereupon in a manner that will minimally distort the film unit. To this end, the present invention is directed.

Referring to FIG. 4, the expandable, lighttight, processing chamber 22 is provided into which the exposed film unit 36 is fed, as the processing composition is being distributed, and retained during the movement of the exposed and processed film unit to a position of storage within the photographic apparatus. Therefore, this lighttight chamber 22 maintains the exposed film unit in darkness while the diffusion transfer process is completed with the film format herein described. The developed visible image is visible through the transparent sheet, and the entire film unit originally positioned in container 30 is repositioned within the camera after processing and is there available for viewing shortly after exposure. The time between exposure and viewing may be on the order of approximately 60 seconds. That is to say, all of the components, for example, photosensitive element, transparent element, binding material, and empty containers of processing composition, comprise the developed film unit and, hence, the finished photograph. None of the materials of the film unit as originally presented for exposure are removed from the developed film unit. Accordingly, it is important that the materials of construction of the film unit itself are not distorted in such a fashion as to impair the aesthetic qualities of the developed film unit or in a manner adversely affecting the developing process.

The present invention enables the movement of an exposed film unit from the exposure position on a plane that is substantially parallel to the inclined exposure plane to a position from where the exposed film unit can be easily directed to another position within the photographic apparatus while being maintained in a distortion-free condition. The means for moving the film unit includes the lighttight chamber 22 which is expandable. This chamber 22 is carried by support means, in turn carried by a fixed portion of the photographic apparatus. At least a portion of the support means is movable on a plane angularly disposed with respect to the exposure plane and drive means are operatively associated with the support means and movable on a plane substantially parallel to the inclined exposure plane.

Figure 3:
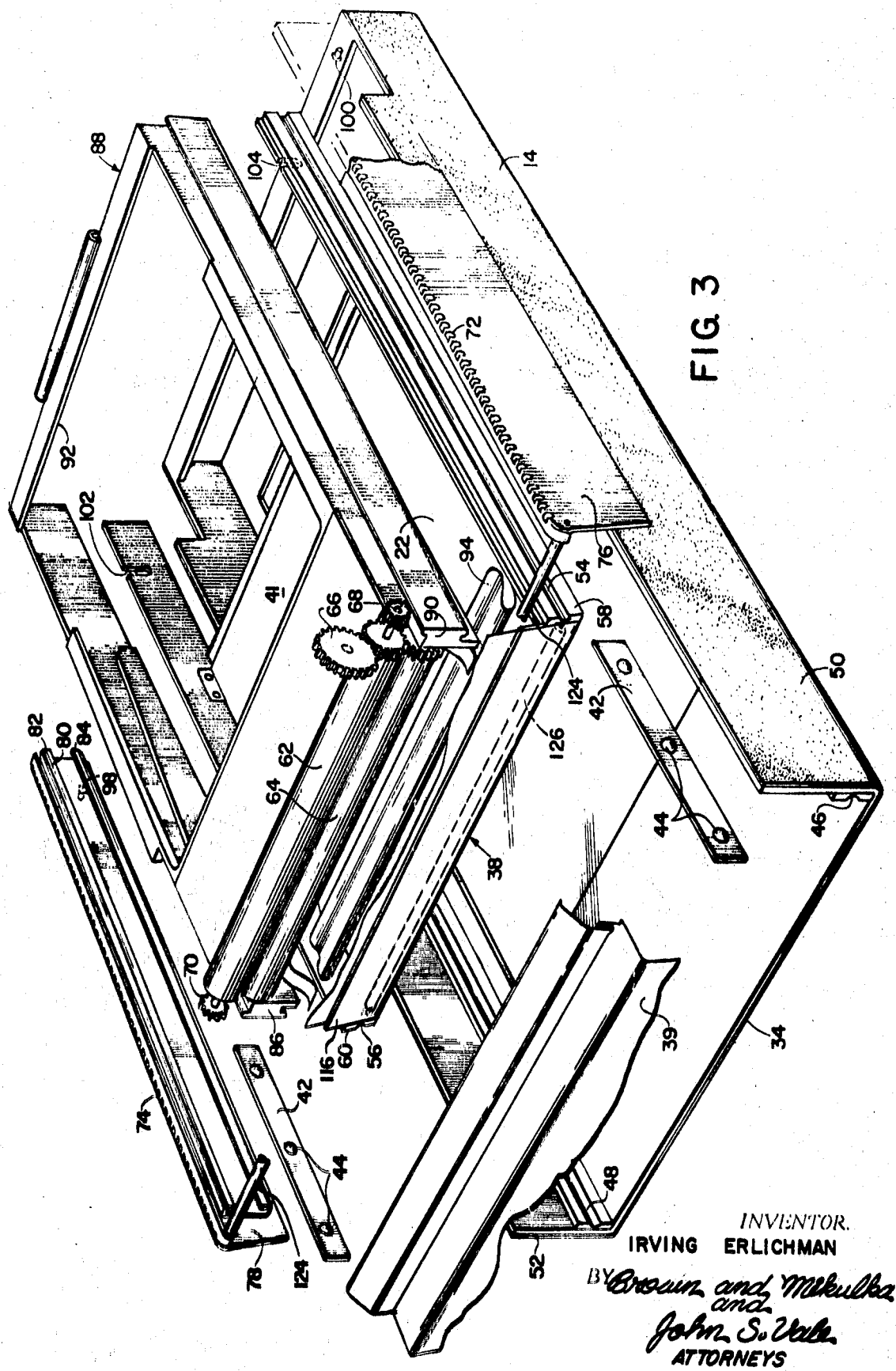
FIG. 3 is an exploded perspective view of the drive mechanism for the processing chamber.

More specifically, and referring to FIGS. 3 and 6, drawer 38 includes a bottom wall 41, dependent front end wall 116 and a pair of dependent drawer support side walls 58 and 60. The support means comprises linear bearing means 40 and associated support structure (See FIG. 6). Linear bearing means 40 generally includes strips 42 and balls 44 trapped therein for rotational movement. Each of the strips 42 is held in a fixed manner with respect to main body 14 with balls 44 carried in grooves 46 and 48 formed in side walls 50 and 52 of body 14 and grooves 54 and 56 formed in drawer-support side walls 58 and 60 respectively.

Processing rollers 62 and 64 are contrarotatably driven together by gear 66, in turn driven through a suitable gear reduction arrangement and a motor, not shown. Pinions or gears 68 and 70 are carried at opposite ends of roller 62 and engage racks 72 and 74 respectively. Racks 72 and 74 are formed on the top edge of elongated drive-guide members 76 and 78. Members 76 and 78 are mirror images of one another, and, in FIG. 3, the structure of member 78 is more clearly shown. Guide 80 has an upper flange 82 and a lower flange 84 adapted to fit around rail 86 carried by drawer-support element 88. Element 88 is the lower portion of camera main housing 14. Drive-guide member 76 is similarly constructed with flanges, not shown, similar to flanges 82 and 84 which cooperate with rail 90 which is a rail similar to rail 86. The bottom surface 92 of drawer-support element 88 is a plane common to inclined exposure plane 32. It is against this surface 92 that container 30 rests in lighttight relationship therewith.

It should be noted that rails 86 and 90 are inclined with respect to bottom wall 34 of housing 14 and extend on a plane which is substantially parallel to inclined exposure plane 32. Therefore, drive-guide members 76 and 78 move on a plane that is substantially parallel to inclined exposure plane 32 and racks 72 and 74 constantly engage pinion gears 68 and 70 through their movement. Further, it should be noted that the opposing surfaces of rollers 62 and 64 fall on either side of a plane common to the exposure plane. Therefore, a film unit disposed on the exposure plane, when moved between the processing rollers 62 and 64, can move toward the exterior of housing 14, in a straight line without undergoing any bending or distortion. It will be noted that the path of travel of the film unit diverges from bottom wall 34 of housing 14.

Referring to FIG. 3, grooves 54 and 56 extend along a line that is parallel with respect to bottom wall 34 of main housing 14 of camera 10. The plane of bottom wall 34 is angularly disposed with respect to exposure plane 32. It is along the plane of bottom wall 34 that exposed film units will be moved after exposure.

Therefore, the present invention is basically concerned with moving an exposed film unit from the inclined exposure plane 32 through processing rollers 62 and 64 on the exposure plane 32 and back into the main housing 14 of camera 10 for storage or viewing along a plane parallel to the plane of bottom wall 34 without distorting the film unit during transit. In actuality, an exposed film unit remains within expandable chamber 22 during film processing, which when mentioned herein, refers to the movement of an exposed film unit from the inclined exposure plane 32 to a position in the photographic apparatus where the developed film unit can be viewed. That is to say, the film unit is moved from the exposure plane 32 through processing rollers 62 and 64 to a point where the rearward edge of the exposed film unit clears the rollers 62 and 64 and is free to be shifted to a plane angularly disposed with respect to the exposure plane by means 94 for changing the planar disposition of the exposed photosensitive element which will be hereinafter described. The exposed film unit is then moved back into the main housing 14 of camera 10 on curtain 39 which covers the bottom wall 41 of drawer 38. After a suitable delay during which time a visible image develops on the exposed film unit, the finished photograph is viewable from this position. In other words, provision can be made to open the rear of main housing 14 so as to be able to withdraw the developed photograph. Such an arrangement is shown in copending application Ser. No. 36,251 filed May 11, 1970, now U.S. Pat. No. 3,675,551 by E. H. Land and I. Erlichman and assigned to the same assignee as the present invention. Until main housing 14 is opened, the film unit remains in a lighttight environment. Therefore, the position in chamber 22 on curtain 39 of exposed film units is herein termed a storage position. It should be understood that this may be viewed as a temporary storage position in that the storage is normally ended when the finished photograph is withdrawn from chamber 22. As hereinafter explained, the photograph can be moved to a permanent storage position under drawer 38 by cycling the subject apparatus when another film unit is exposed as shown in copending application Ser. No. 36,251, now U.S. Pat. No. 3,675,551.

The drive means controls movement of an exposed photosensitive element from the exposure position along the exposure plane to a first extreme of movement where the entire exposed photosensitive element has passed the means for distributing the processing composition. The drive means generally comprises the racks 72 and 74, and gears 68 and 70 also includes drive pins 98 and 100. Drive pins 98 and 100 cooperate with slots 102 and 104 respectively, formed in drawer side walls 58 and 60, to form a pivotable drive connection between the drive and support means. Therefore, it becomes obvious that the drive connections of the aforementioned pins 98 and 100 and slots 102 and 104 accommodate the difference in planes of movement of the racks 72 and 74 relative to the drawer 38. That is to say, drawer 38 moves along the plane defined by grooves 54 and 56, whereas racks 72 and 74 move parallel to the exposure plane. The drive pins and slots allow for this relative angular movement by accommodating the upward movement of drive pins 98 and 100 relative to slots 102 and 104 as the racks 72 and 74 move upwardly with respect to bottom wall 34. Viewing FIG. 3, this relative movement becomes clearer when viewing the angular disposition of rails 86 and 90 relative to bottom wall 34.

As noted earlier the expandable lighttight chamber 22 is formed by drawer 38, elongated members 76 and 78 which include racks 72 and 74, and an opaque flexible curtain 39. The bottom wall of chamber 22 is formed by the bottom wall 41 of drawer 38. The chamber side walls are formed by drawer side walls 58 and 60 in cooperative association with the elongated members 76 and 78. As best shown in FIG. 6, drawer side walls 58 and 60 extend upwardly from drawer bottom wall 41. Elongated members 76 and 78 are located within drawer side walls 58 and 60 in side-by-side relation therewith.

The height of chamber 22 is considered to be the vertical distance from bottom wall 41 of drawer 38 to a point just below the racks 72 and 74 formed in elongated members 76 and 78.

As the racks 72 and 74 are driven forwardly of the processing rollers 62 and 64 by pinions 68 and 70, pins 98 and 100 engage slots 102 and 104 in drawer side walls 58 and 60 causing the drawer to be driven forwardly along with the elongated members 76 and 78. Guided by the inclined rails 86 and 90 the elongated members 76 and 78 move upwardly in a vertical direction with respect to the bottom wall 41 of drawer 38 and the bottom wall 34 of housing 14. The elongated members also move in a plane substantially parallel to drawer side walls 58 and 60. It will be noted, however, that the drawer side walls 58 and 60 and the elongated members 76 and 78 are dimensioned such that the lower portion of members 76 and 78 overlap the upper portion of the drawer side walls when the chamber 22 is fully extended and members 76 and 78 reach their maximum vertical movement above the bottom wall 41 of drawer 38. The overlapping serves to maintain the interface between members 76 and 78 and drawer side walls 58 and 60 in a lighttight condition. As the chamber is retracted into housing 14, the elongated members 76 and 78, again guided by the inclined rails 86 and 90, move downwardly toward the bottom wall 41 of drawer 38 and the bottom wall 34 of housing 14. Thus, it can be seen that elongated members 76 and 78 are operatively associated with drawer side walls 58 and 60 to form expandable, lighttight, side walls of the chamber 22 and that the vertical movement of the elongated members relative to the bottom wall 41 of drawer 38 serves progressively to increase the height of chamber 22 as it is extended from housing 14 and to decrease the height of chamber 22 as it is retracted into housing 14.

As best shown in FIG. 3, drawer 38 is open at the top and rear such that it may be retracted into housing 14 in telescoping relation with the film container 30. That is to say, the bottom wall 41 of drawer 38 is located between the bottom wall 34 of housing 14 and the bottom of film container 30 and the expandable side walls of the chamber 22 are positioned between the side walls of container 30 and the side walls 50 and 52 of housing 14.

The top of chamber 22 is uncovered when the chamber is fully retracted into housing 14 to permit exposure of the forwardmost film unit. As the chamber is extended from housing 14, in advance of the advancing film unit, curtain 39 covers the open top of the chamber to maintain it in a lighttight condition. Curtain 39 is attached at one end to housing 14, forwardly of roller 62 (See FIG. 4). From there it extends forwardly and passes around a roller 124, rotatably mounted between the forward ends of elongated members 76 and 78. Curtain 39 then extends downwardly and passes around roller 126 rotatably mounted between the forward ends of drawer side walls 58 and 60. Covering the bottom wall 41 of drawer 38, the curtain is folded back under bottom wall 41 of drawer 38 and its opposite end attached to the bottom wall 34 of housing 14. For a more detailed description of the operation of curtain 39, reference may be made to copending application Ser. No. 179 Jan. 2, 1970, now U.S. Pat. No. 3,653,308.

As best shown in FIG. 1 curtain 39 cooperates with elongated members 76 and 78 to form the top wall of chamber 22. It also cooperates with the front wall 116 of drawer 38 to form an expandable front wall of the chamber 22.

As the drawer 38 and the elongated members 76 and 78 are extended from housing 14, while progressively moving away from one another, the space between the rollers 124 and 126 increases since roller 124 is mounted on the elongated members 76 and 78 and roller 126 is secured to drawer 38. The resulting space between the top of drawer front wall 116 and the forward end of elongated members 76 and 78 is covered by that portion of curtain 39 extending between the rollers 124 and 126. Roller 124 also supports curtain 39 over the top of drawer 38 and progressively elevates the curtain above the bottom wall 41 of the drawer to prevent the film unit travelling along its inclined path from engaging the top wall (curtain 39) of the expandable chamber 22. Or in other words, chamber 22 is adapted to expand and contract in a direction normal to the bottom wall 34 of housing 14.

Referring to FIG. 4, drawer 38 is shown fully extended, and means 94 is illustrated gripping a film unit that has completely passed between rollers 62 and 64. Referring to FIG. 5, means 94 comprises an elongated resilient member 106 having a looped end 108 with a back-turned flange 110. Member 106 is normally biased upwardly toward the position it assumes in FIG. 4. As seen in FIG. 5, the film unit initially contacts downwardly biased end 112 of member 106 and is wedged between flange 110 and end 112. The angular disposition of flange 110 relative to end 112 in area 114 makes it clear that a film unit entering area 114 will be biased downwardly toward wall 34. As more clearly set forth in Ser. No. 5,799, now U.S. Pat. No. 3,619,192, previously mentioned, the portion of the film unit that enters area 114 is the processing composition container area which has previously been voided of processing composition. This is not an area of the film unit on which an image will be portrayed. Therefore, any minor abrasion or distortion to this portion of the film unit is not damaging to the aesthetic qualities of the photograph. However, the film unit 36 is relatively rigid, and, due to the bias created by flange 110 and end 112 when the trailing edge of the film unit clears rollers 62 and 64, it will be pivoted downwardly to a configuration shown best in FIG. 4.

OPERATION

A cycle of the subject apparatus is initiated upon the operation of appropriate shutter mechanism which exposes the forwardmost film unit 36 in container 30. As more completely described in Ser. No. 763,883, now U.S. Pat. No. 3,589,253, previously mentioned, the subject photographic apparatus cycles automatically. That is to say, immediately after exposure, a suitable pick mechanism, such as shown in my copending application Ser. No. 179, now U.S. Pat. No. 3,653,308, engages an aperture in the forwardmost film unit 36 and pulls it from container 30 into the bite of rollers 62 and 64 which cooperate with the pick to provide means for advancing the film unit toward the exterior of housing 14. The rollers 62 and 64 begin to rotate in sequence after the shutter mechanism is operated, and, therefore, gears 68 and 70 cooperate with racks 72 and 74 to move the racks toward the left as viewed in FIGS. 4 and 5. Movement of racks 72 and 74 causes the elongated drive-guide members 76 and 78 to move in the same direction along rails 86 and 90. Guide pins 98 and 100, carried by members 76 and 78 respectively, move drawer 38 in the same direction due to their interengagement with slots 102 and 104.

As the exposed film unit enters the bite of rollers 62 and 64, the pick mechanism is disabled as described in the previously mentioned copending application. Further movement of the film unit along exposure plane 32 is due solely to the movement generated by the contrarotating rollers 62 and 64. It is to be noted that rollers 62 and 64 have a circumference that, when combined with their rotational speed, drives the exposed film unit along the exposure plane 32 at a faster rate of speed than gears 68 and 70 move drawer 38 so that the leading edge of the film unit may overtake and engage the film angle changing means 94.

Referring to FIG. 5, the drawer is shown nearly fully extended by dotted lines with the film unit 36 shown in its initial contact with member 106. In FIG. 4, film unit 36 is shown pivoted around the end held in area 114 downwardly away from rollers 62 and 64 against curtain 39. The configuration of the drawer 38 shown in FIG. 4 represents the furthest extension of drawer 38 and the maximum volume of chamber 22 since the side walls and the front of the chamber 22 are fully expanded.

When drawer 38 is at this point, the motor, not shown, is reversed so as to reverse the rotation of rollers 62 and 64 along with appending gears 68 and 70. From this point chamber 22 is retracted into housing 14 causing the side walls and the front wall of the chamber to contract such that the chamber assumes its minimum volume when fully retracted into the housing 14.

As chamber 22 is retracted, member 106 is driven downwardly by two spring elements 120, only one shown, which engage member 106 at its lateral extremes so that film unit 36 passes therebetween. As drawer 38 moves further back into the camera 10, film unit 36 is guided beneath container 30 by deflector 122. Deflector 122 precludes the possibility of film unit 36 coming into interference with the front edge of container 30. Therefore, film unit 36 is subjected to the very minimum amount of bending as it is fed beneath container 30 as spring elements 120 progressively feed means 94 in the direction of curtain 39.

When drawer 38 has reassumed the position shown in FIG. 6 in solid lines, the film unit is positioned almost entirely beneath container 30 and power is shut off to the motor, not shown, to prevent further movement of the associated support or drive means. This is the stored position for the exposed film unit, and it is from this position that the film unit can be manually reached for viewing as more completely described in my copending application Ser. No. 36,251 now U.S. Pat. No. 3,675,551, previously mentioned.

Therefore, means have been provided for moving the expandable lighttight chamber 22 out of the main camera housing 14 in such a fashion that an exposed photosensitive element is moved from the inclined exposure position to another position within the photographic apparatus while being maintained in a distortion-free condition. Specifically, support means are carried by a fixed portion of the photographic apparatus and movable on a plane angularly disposed with respect to the exposure plane. Drive means are operatively associated with the support means and movable on a plane substantially parallel to the exposure plane. The entire range of movement of the exposed film unit is accomplished while the film unit remains in a lighttight environment, enabling the simultaneous development of the exposed unit. The total time involved in moving the film unit from the exposure plane to the storage position can be on the order of approximately 1½ seconds. The time for developing the exposed film unit may be on the order of 60 seconds. If the film unit utilized is one developed after being chemically opacified, the film unit can be immediately removed or viewed from its temporary storage position. If the film unit is one utilizing more conventional developing techniques, a delay is necessitated after the exposed film unit reaches the temporary storage position. A suitable timing device can be used to determine the length of time necessary for the film unit to remain in temporary storage or automatic means can be provided with the subject invention to preclude prematurely exposing the previously exposed film unit.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus comprising:
   a housing including a bottom wall;
   means for supporting a film unit within said housing at an exposure plane disposed at an inclined angle relative to said bottom wall;
   means for advancing a film unit, subsequent to exposure, along said inclined exposure plane toward the exterior of said housing;
   means for defining an expandable lighttight chamber adapted to be extended from said housing for receiving a film unit from said advancing means and thereafter to be retracted into said housing for transporting a film unit therewith to a storage position within said housing; and
   means coupling said expandable chamber to said housing for progressively expanding said expandable chamber in a direction substantially normal to said bottom wall as said chamber is extended from said housing to enclose the inclined path of travel of a film unit and for progressively contracting said chamber as said chamber is retracted into said housing to facilitate storage of said chamber within said housing.

2. A photographic apparatus as defined in claim 1 wherein the volume of said chamber is at a maximum when said chamber reaches its terminal point of extension from said housing.

3. A photographic apparatus as defined in claim 1 wherein the volume of said chamber is at a minimum when said chamber reaches its terminal point of retraction into said housing.

4. A photographic apparatus as defined in claim 1 wherein said chamber is configured to include a pair of expandable side walls.

5. A photographic apparatus as defined in claim 4 wherein said chamber is configured to further include an expandable front wall.

6. A photographic apparatus comprising:
   a housing including a bottom wall;
   means for supporting a film unit within said housing at an exposure plane disposed at an inclined angle relative to said bottom wall;
   means for advancing a film unit, subsequent to exposure, along said inclined exposure plane toward the exterior of said housing;
   means for defining an expandable lighttight chamber adapted to be extended from said housing for receiving a film unit from said advancing means and thereafter to be retracted into said housing for transporting a film unit therewith to a storage position within said housing, said means for defining said expandable lighttight chamber including a drawer coupled to said housing for movement along a plane substantially parallel to said bottom wall of said housing and elongated members coupled to said housing for movement along a plane substantially parallel to said inclined exposure plane, said elongated members being operatively associated with said drawer to form expandable side walls of said chamber; and
   means coupling said expandable chamber to said housing such that it progressively expands as it is extended from said housing to enclose the inclined path of travel of said film unit, and progressively contracts as it is retracted into said housing to facilitate storage of said chamber within said housing.

7. A photographic apparatus as defined in claim 6 wherein said means for defining said expandable lighttight chamber further includes an opaque curtain supported over said drawer, said curtain being coupled to said elongated members which are operative to vary the distance between said curtain and said drawer as said drawer and said elongated member are extended from and retracted into said housing.

8. A photographic apparatus as defined in claim 7 wherein said elongated members are operative to elevate a curtain above said inclined exposure plane to prevent said film unit from engaging said curtain as a film unit is advanced from said housing.

9. A photographic apparatus as defined in claim 7 wherein said drawer includes a front wall operatively associated with said curtain to form an expandable front wall of said chamber.

10. A photographic apparatus comprising:
    a housing including a bottom wall;
    means for supporting a film unit within said housing at an exposure plane disposed at an inclined angle relative to said bottom wall;
    means for advancing a film unit, subsequent to exposure, along said inclined exposure plane toward the exterior of said housing;
    a drawer, extendable from said housing along a plane substantially parallel to said bottom wall, for receiving a film unit from said advancing means, and thereafter retractable into said housing for transporting a film unit to a storage position therein;
    elongated members coupled to said drawer and movable along a plane substantially parallel to said inclined exposure plane for extending and retracting said drawer; and
    a curtain operatively associated with said drawer and said elongated members for forming an expandable lighttight chamber around the path of travel of a film unit, said curtain being movable by said elongated members away from said drawer to expand the volume of said chamber as said drawer is extended from said housing and being movable toward said drawer as said drawer is retracted into said housing to decrease the volume of said chamber.

11. A photographic apparatus as defined in claim 10 wherein said drawer includes a pair of side walls which are adapted to cooperate with said elongated members to form expandable side walls of said lighttight chamber.

12. A photographic apparatus as defined in claim 10 wherein said drawer includes a front wall operatively associated with said curtain to form an expandable front wall of said chamber.

13. A photographic apparatus as defined in claim 10 further including means within said chamber for biasing a film unit toward said bottom wall of said housing, upon disengagement from said advancing means, to reorient and align a film unit for transport to said storage position within said housing.

14. A photographic apparatus as defined in claim 10 wherein said advancing means is coupled to said elongated members for reciprocally driving said expandable chamber between its extended and retracted positions.

15. Photographic apparatus of the self-developing type comprising:
   means for supporting a relatively flat photosensitive element on an exposure plane;
   means for distributing a processing composition on an exposed photosensitive element;
   means for carrying an exposed photosensitive element in an expandable processing chamber to another position within the photographic apparatus; and
   means for moving an expandable processing chamber including support means having a slot formed therein, said support means being carried by a fixed portion of the photographic apparatus and being movable on a second plane angularly disposed with respect to the exposure plane, and drive means operatively associated with said support means and movable on a plane substantially parallel to the exposure plane whereby an exposed photosensitive element is moved from an exposure position to another position within the photographic apparatus while being maintained in a distortion-free condition, said drive means including rack means and pinion means and said rack means comprising at least one elongated member guided for movement in a direction parallel to the exposure plane while cooperating with said support means for driving said support means along said second plane, the cooperative drive connection between said rack means and said support means including a pin carried by said rack means and said slot formed in said support means thereby accommodating an angular movement of said rack means with respect to said support means.

16. Photographic apparatus of the self-developing type comprising:
   means for supporting a relatively flat photosensitive element on an exposure plane;
   means for distributing a processing composition on an exposed photosensitive element;
   means for carrying an exposed photosensitive element in an expandable processing chamber to another position within the photographic apparatus; and
   means for moving an expandable processing chamber including support means having at least one slot formed in a portion thereof, said support means being carried by a fixed portion of the photographic apparatus and being movable on a second plane angularly disposed with respect to the exposure plane, and drive means operatively associated with said support means and movable on a plane substantially parallel to the exposure plane whereby an exposed photosensitive element is moved from an exposure position to another position within the photographic apparatus while being maintained in a distortion-free condition, said drive means including rack means and pinion means said rack means including at least one drive pin cooperating with said one slot formed in said portion of said support means so that movement of said support means at an angle relative to the direction of movement of said drive means is permitted as said processing chamber expands and shrinks during reciprocating movement thereof.

* * * * *